(12) United States Patent
Forsell

(10) Patent No.: US 11,061,817 B2
(45) Date of Patent: Jul. 13, 2021

(54) MEMORY NODE WITH CACHE FOR EMULATED SHARED MEMORY COMPUTERS

(71) Applicant: Teknologian tutkimuskeskus VTT Oy, Ytt (FI)

(72) Inventor: Martti Forsell, Vtt (FI)

(73) Assignee: Teknologian tutkimuskeskus VTT Oy, VTT (FI)

( * ) Notice: Subject to any disclaimer, the term of this patent is extended or adjusted under 35 U.S.C. 154(b) by 0 days.

(21) Appl. No.: 16/066,355

(22) PCT Filed: Dec. 22, 2016

(86) PCT No.: PCT/FI2016/050915
§ 371 (c)(1),
(2) Date: Jun. 27, 2018

(87) PCT Pub. No.: WO2017/115007
PCT Pub. Date: Jul. 6, 2017

(65) Prior Publication Data
US 2019/0004950 A1  Jan. 3, 2019

(30) Foreign Application Priority Data
Dec. 29, 2015 (EP) .................................. 15202883

(51) Int. Cl.
*G06F 12/084* (2016.01)
*G06F 12/121* (2016.01)
(Continued)

(52) U.S. Cl.
CPC ........ *G06F 12/084* (2013.01); *G06F 12/0842* (2013.01); *G06F 12/0846* (2013.01);
(Continued)

(58) Field of Classification Search
CPC ............... G06F 12/084; G06F 12/0842; G06F 12/0846; G06F 12/0853; G06F 12/121; G06F 2212/1021; G06F 2212/608
See application file for complete search history.

(56) References Cited

U.S. PATENT DOCUMENTS

2002/0019912 A1* 2/2002 Mattausch .......... G06F 12/0853
  711/131
2005/0273571 A1* 12/2005 Lyon ................... G06F 9/45537
  711/203
(Continued)

FOREIGN PATENT DOCUMENTS

EP  2806361 A1  11/2014
EP  2866138 A1 *  4/2015  .......... G06F 9/3873
(Continued)

OTHER PUBLICATIONS

Martti Forsell et al: "Supporting Ordered Multiprefix Operations in Emulated Shared Memory CMPs".
(Continued)

*Primary Examiner* — Zhuo H Li
(74) *Attorney, Agent, or Firm* — Merchant & Gould P.C.

(57) ABSTRACT

Data memory node (400) for ESM (Emulated Share Memory) architectures (100, 200), comprising a data memory module (402) containing data memory for storing input data therein and retrieving stored data therefrom responsive to predetermined control signals, a multi-port cache (404) for the data memory, said cache being provided with at least one read port (404A, 404B) and at least one write port (404C, 404D, 404E), said cache (404) being configured to hold recently and/or frequently used data stored in the data memory (402), and an active memory unit (406) at least functionally connected to a plurality of processors via an interconnection network (108), said active memory unit (406) being configured to operate the cache
(Continued)

(404) upon receiving a multioperation reference (410) incorporating a memory reference to the data memory of the data memory module from a number of processors of said plurality, wherein responsive to the receipt of the multioperation reference the active memory unit (406) is configured to process the multioperation reference according to the type of the multioperation indicated in the reference, utilizing cached data in accordance with the memory reference and data provided in the multioperation reference. A method to be performed by the memory node is also presented.

11 Claims, 3 Drawing Sheets

(51) Int. Cl.
*G06F 12/0842* (2016.01)
*G06F 12/0853* (2016.01)
*G06F 12/0846* (2016.01)

(52) U.S. Cl.
CPC ........ *G06F 12/0853* (2013.01); *G06F 12/121* (2013.01); *G06F 2212/1021* (2013.01); *G06F 2212/608* (2013.01)

(56) References Cited

U.S. PATENT DOCUMENTS

| | | | |
|---|---|---|---|
| 2014/0258628 A1* | 9/2014 | Shivashankaraiah | G06F 12/0842 711/129 |
| 2016/0154753 A1* | 6/2016 | Gittins | G06F 12/0864 710/117 |
| 2016/0283249 A1* | 9/2016 | Forsell | G06F 9/3001 |
| 2016/0314001 A1* | 10/2016 | Forsell | G06F 9/3873 |

FOREIGN PATENT DOCUMENTS

| | | | | |
|---|---|---|---|---|
| EP | 2866138 A1 | | 4/2015 | |
| EP | 3188025 A1 * | | 7/2017 | ........... G06F 12/084 |

OTHER PUBLICATIONS

European Patent Office, Search Report dated Apr. 8, 2016 in EP patent application No. 15202883.3.

* cited by examiner

MEMORY NODE WITH CACHE FOR EMULATED SHARED MEMORY COMPUTERS

PRIORITY

This application is a U.S national application of the international application number PCT/FI2016/050915 filed on 22 Dec. 2016, which claims priority of European patent application EP15202883.3 filed on Dec. 29, 2015, the contents of all of which are incorporated herein by reference.

FIELD OF THE INVENTION

Generally the present invention pertains to computer science and computer architectures. In particular, the invention relates to the optimization of memory module architecture in connection with emulated shared memory architectures.

BACKGROUND

In SMAs (shared memory architecture), data and program partitioning is typically carried out by placing data requiring processing by multiple threads into shared memory and splitting program more independently to processors, thus making programming easier compared to message passing (MPA) architectures in which processing happens always locally and the programmer is responsible for moving data around accordingly. Most SMAs use a distributed shared memory architecture consisting of multiple interconnected processor-cache pairs, which makes cache coherency (and therefore latency tolerance) and synchronicity maintenance very expensive. This may even ruin their performance in communication intensive problems.

To tackle e.g. the above problem, emulated shared memory (ESM), or shared memory emulation, architectures have been introduced. They incorporate a set of multi-threaded processors that are connected via a high-throughput intercommunication network to a common uniformly and synchronously accessible shared memory. The memory system latency is hidden by overlapping on-going memory references and a special low-cost synchronization mechanism is established guaranteeing synchronicity at machine instruction level. The ESM systems provide the user with perception of ideal shared memory even though the actual hardware architecture comprises a physically distributed memory. From a theoretical standpoint, these architectures attempt to emulate the abstract parallel random access machine (PRAM) that is commonly used as a model for describing and analyzing the intrinsic parallelism of computational problems as well as performance and cost of executing parallel algorithms due to its simplicity and expressivity. A PRAM model generally refers to a set of processors working under the same clock and a uniform single step accessible shared memory connected to them.

Accordingly, ESM is a feasible technique to address programmability and performance scalability concerns of chip multiprocessors (CMP) as it yields implied synchrony in the execution of machine instructions, efficient latency hiding technique, and sufficient bandwidth to route all the memory references even with heavy random and concurrent access workloads. Synchronous execution is considered to make programming easier as a programmer does not need to synchronize the threads of execution explicitly after each global memory access but can rely on the hardware to take care of that automatically, whereas e.g. in message passing architectures (MPA), a programmer is responsible for explicitly defining communication, synchronizing subtasks, and describing data and program partitioning between threads making MPAs difficult to program. Latency hiding applied in shared memory emulation makes use of the high-throughput computing scheme, where other threads are executed while a thread refers to the global shared memory. Since the throughput computing scheme employs parallel slackness extracted from the available thread-level parallelism, it is considered to provide enhanced scalability in contrast to traditional symmetric multiprocessors and non-uniform memory access (NUMA) systems relying on snooping or directory-based cache coherence mechanisms and therefore suffering from limited bandwidth or directory access delays and heavy coherence traffic maintenance.

Recently, scalable ESM architectures have been suggested incorporating step caches to implement the concurrent read concurrent write (CRCW) memory access variant of PRAM, which further simplifies programming and increases performance by a logarithmic factor in certain cases. Also a mechanism to support constant execution time multi(-prefix) operations-implementing even stronger multioperation concurrent read concurrent write (MCRCW) variant of the PRAM model has been implemented with the help of scratchpads that are attached to step caches in order to bound the associativity of step caches. For instance, publications 1: M. Forsell, Step Caches-a Novel Approach to Concurrent Memory Access on Shared Memory MP-SOCs, In the Proceedings of the 23th IEEE NORCHIP Conference, Nov. 21-22, 2005, Oulu, Finland, 74-77, 2: M. Forsell, Reducing the associativity and size of step caches in CRCW operation, In the Proceeding of 8th Workshop on Advances in Parallel and Distributed Computational Models (in conjunction with the 20th IEEE International Parallel and Distributed Processing Symposium, IPDPS'06), Apr. 25, 2006, Rhodes, Greece, 3: M. Forsell, Realizing Multioperations for Step Cached MP-SOCs, In the Proceedings of the International Symposium on System-on-Chip 2006 (SOC'06), Nov. 14-16, 2006, Tampere, Finland, 77-82., 4: M. Forsell, TOTAL ECLIPSE—An Efficient Architectural Realization of the Parallel Random Access Machine, In Parallel and Distributed Computing Edited by Alberto Ros, IN-TECH, Vienna, 2010, 39-64, and 5: M. Forsell and J. Roivainen, Supporting Ordered Multiprefix Operations in Emulated Shared Memory CMPs, In the Proceedings of the 2011 International Conference on Parallel and Distributed Processing Techniques and Applications (PDPTA'11), Jul. 18-21, 2011, Las Vegas, USA, 506-512, contemplate different aspects of such a solution and are thereby incorporated herein by reference in their entireties. Multi(-prefix) operations can be defined for many basic operations, e.g. ADD, SUB, MAX etc., and considered as parallel primitives due to the capability to express parallel algorithms. They can be used for synchronization and parallel data structures simultaneously accessed by several processors without race conditions and other anomalies of architectures executing threads asynchronously.

In FIG. 1, a high-level illustration of a scalable architecture to emulate shared memory on a silicon platform is shown. It comprises a set of processors (cores) P1, P2, P3, . . . , Pp 102 connected to a physically distributed, but logically shared (data) memory M1, M2, M3, . . . , Mp 112 via a physically scalable high bandwidth interconnection network 108. Active memory units 110 in connection with data memory 112 can be considered as memory control logic units utilized to process the memory references. The active memory units 110 are arranged to manage computation related to cases in which multiple memory references are targeted to the same memory location during e.g. multi(-prefix) operations, for instance. Instruction memory modules I1, I2, I3, . . . , Ip 104 are configured to carry the program code for each processor 102. To efficiently emulate shared memory by the distributed memory-based implementation, the processors 102 are multithreaded utilizing a Tp-stage cyclic, interleaved inter-thread pipeline (Tp>=the average latency of the network). The PRAM model is linked to the architecture such that a full cycle in the pipeline corresponds typically to a single PRAM step. During a step of multi-threaded execution (regarding the pipeline in overall, i.e. all pipeline stages including the actual execution stage), each thread of each processor of the CMP executes an instruction including at most one shared memory reference sub-instruction. Therefore a step lasts for multiple, at least Tp+1 clock cycles.

In the depicted architecture, step caches are generally associative memory buffers in which data stays valid only to the end of ongoing step of multithreaded execution.

The main contribution of step caches to concurrent accesses is that they step-wisely filter out everything but the first reference for each referenced memory location. This reduces the number of requests per location from P Tp down to P allowing them to be processed sequentially on a single ported memory module assuming Tp>=P. Scratchpads are addressable memory buffers that are used to store memory access data to keep the associativity of step caches limited in implementing multioperations with the help of step caches and minimal on-core and off-core ALUs (arithmetic logic unit) that take care of actual intra-processor and inter-processor computation for multioperations. Scratchpads may be coupled with step caches to establish so-called scratchpad step cache units S1, S2, S3, . . . , Sp 106.

One underlying idea of the shown solution is indeed in the allocation of each processor core 102 with a set of threads that are executed efficiently in an interleaved manner and hiding the latency of the network. As a thread makes a memory reference, the executed thread is changed and the next thread can make its memory request and so on. No memory delay will occur provided that the reply of the memory reference of the thread arrives to the processor core before the thread is put back to execution. This requires that the bandwidth of the network is high enough and hot spots can be avoided in pipelined memory access traffic. Synchronicity between consecutive instructions can be guaranteed by using an elastic synchronization wave between the steps, for instance.

FIG. 2 shows, at 200, one illustration of an ESM CMP architecture incorporating e.g. the aforementioned active memory units 112B (in connection with data memory modules 112) and scratchpads 206B. The network 108 may be a mesh-like interconnection network acting as a high-bandwidth pipelined memory system with switches 108B. The memory access latency is hidden by executing other threads while a thread is referencing the uniformly accessible distributed shared memory via the network 108. Congestion of references and hot spots in communication are avoided with an efficient dead-lock free intercommunication architecture featuring high bandwidth (bisection BW>=P/4) and randomized hashing of memory locations over the distributed memory modules. Execution of instructions happens in steps corresponding to a single PRAM step during which each thread executes a single instruction.

Having regard to concurrent memory access, the multi(-prefix) operations can be implemented as two consecutive single step operations, for example. During the first step, a starting operation executes a processor-wise multioperation against a step cache location without making any reference to the external memory system. During the second step, an ending operation performs the rest of the multioperation so that the first reference to a previously initialized memory location triggers an external memory reference using the processor-wise multioperation result as an operand. The external memory references that are targeted to the same location may be processed in the active memory unit of the corresponding memory module according to the type of the multioperation. An active memory unit 112B may comprise or basically consist of a simple ALU and fetcher, for example. In the case of arbitrary ordered multiprefixes the reply data is sent back to scratchpads 206B of participating processors. The consecutive references are completed by applying the reply data against the step cached reply data.

FIG. 3 shows one realization of a modified active memory unit 112C. The modified active memory units 112C consist of an ALU 302 and a multiplexer 304 like the baseline active memory unit 112B of previous figure but adds also two multiplexers 306, control logic 308, another ALU 302B, two registers 310, and two multiprefix arrays 312. The baseline solutions of concurrent memory access and arbitrary ordered multiprefixes have typically failed to preserve the ordering of participating threads in the multiprefixes and have therefore introduced a logarithmic slowdown for the ordered ones. In practice, the memory references arrive at the destination module in the order dependent on the distance of target memory module from the source processors, traffic situation, and relative timing of threads compared to each other. To retain the generally high performance provided by baseline solutions in concurrent memory access and to also restore the ordering of references participating to multiprefix operations for an arbitrary number of threads, a three step algorithm called as multi-prefix array technique has been suggested. It operates identically to the baseline solution during step one, adding an array to the active memory unit for storing and ordering references according to their source processor IDs during step two, and control logic for processing the references in order during step three. To enable overlapped processing of this kind of a dual instruction solution, an additional array and storage for keeping the target memory value are needed so that one is dedicated for processing (processing array, cumulative data register) while another is filled with references (loading array, data register).

Despite of the many aforementioned advantages, ESM systems have appeared difficult to realize in truly optimal fashion. A physically feasible memory unit (MU) for handling data memory references of a multi-threaded processor and especially making use of step cache and scratchpad techniques to support strong concurrent memory access and multi(-prefix) operations is easily comprehensible as one key component of powerful emulated shared memory architecture like REPLICA (REmoving Performance and programmability LImitations of Chip multiprocessor Architectures), which is basically a configurable ESM. Such MU sends the outgoing memory references to the shared memory system as well as waits and receives possible replies therefrom, for instance. Publication EP2806361 discloses one preferred embodiment of the aforementioned memory unit.

However, in addition to step cache/scratchpad solutions in connection with afore-explained memory units also the physically distributed but operatively connected (via the high bandwidth interconnection network) data memory nodes of the shared memory system accessed via the active memory units, few embodiments of which were already reviewed above, could be considered further. The existing solutions suggested in the literature tend to lack details or are strikingly complex, provide often somewhat limited performance having regard to e.g. exclusive and concurrent memory access, are tricky to program, consume a lot of power and introduce serious cost due to the use of pricey double clock rate memories among other deficiencies.

SUMMARY

The objective of the present invention is to at least alleviate one or more of the above drawbacks associated with the existing solutions in the context of parallel processors, particularly emulated shared memory (ESM) computers, in terms of data memory access.

The objective is achieved with different embodiments of a shared data memory node for ESM computers disclosed herein.

According to one aspect, a data memory node for ESM architectures, comprises data memory module containing data memory for storing input data therein and retrieving stored data therefrom responsive to predetermined control signals, a multi-port, preferably dual-port, cache for the data memory, said cache being provided with at least one read port and at least one write port, said cache being configured to hold recently and/or frequently used data stored in the data memory, and active memory unit at least functionally connected to a plurality of processors via an interconnection network, said active memory unit being configured to operate the cache upon receiving a multioperation reference incorporating a memory reference to the data memory of the data memory module from a number of processors of the plurality, said multioperation reference optionally being or at least including a multi-prefix reference, wherein responsive to the receipt of the multioperation reference the active memory unit is configured to process the multioperation reference according to the type of the multioperation indicated in the reference, utilizing cached data in accordance with the memory reference and data provided in the multioperation reference.

In various embodiments, the data memory node is configured to return the multioperation results to the number of processor(s), which establish at least portion of the plurality of processors. The final multioperation result determination may then take place at the concerned processor(s) based on e.g. further data locally available at the processor(s).

In various embodiments, responsive to receiving the data memory reference, the active memory unit is configured to execute a cache search to determine whether the referenced data is available in the cache or not.

In the case of a hit (i.e. the data is available in the cache), the multioperation may be performed in the active memory unit directly using the cached data in accordance with the memory reference and data in the multioperation reference. The result of the operation is written into the cache. Depending e.g. on the used cache policy, the result of the multioperation reference may be written to the data memory either substantially immediately or later.

In contrast, responsive to a cache miss, an unused cache line may be allocated if available and the data from the access address is fetched from the memory. The rest of the operation is done similarly as in the case of hit.

In case there are no suitable free cache lines available, an occupied (already in use) line is selected according to used cache line replacement policy. If necessary, the existing data in the line may be first written into the data memory and then the operation may be done similarly as in the case of a miss with unused cache line available.

In various embodiments, the data memory module may comprise or be at least functionally associated with a memory controller for managing the reading of data from and writing of data to the memory space thereof responsive to the control signals indicative of the concerned data address and desired operation (read/write). At least part of the signals may be established, triggered and/or forwarded by the active memory unit and/or cache.

In various embodiments, the data memory node may comprise an intermediate reference register configured to input, store and pass incoming multioperation references towards the active memory unit responsive to pipeline operation or pipeline 'clocking' of the underlying architecture including memory access.

In an embodiment, a parallel processor system, preferably ESM system, comprises a plurality of processors and multiple instances of one or more embodiments of data memory nodes suggested herein, connected operatively together via an intercommunication network. The data memory nodes constitute at least part of a physically distributed, logically shared larger data memory of the system.

According to another aspect, a method for executing a multioperation in a memory node of a parallel processor computing system, preferably ESM system, said node comprising a data memory module containing data memory for storing data, a multi-port cache for the data memory, and active memory unit at least functionally connected to a plurality of processors via an interconnection network, said method comprises receiving a multioperation reference incorporating a memory reference to the data memory from a number of processors of the plurality, processing the multioperation reference according to the type of the multioperation indicated in the multioperation reference, utilizing cached data in accordance with the memory reference and data provided in the multioperation reference, and providing the outcome of the processing to said number of processors.

Various embodiments of the memory node may be flexibly applied to the embodiments of the method mutatis mutandis and vice versa, as being readily understood by a person skilled in art.

Having regard to the utility of various embodiments of the present invention, a plurality of different benefits may be obtainable over prior art depending on the particulars of each embodiment.

Emulated shared memory computers or more generally parallel processors, for which the suggested memory module is primarily aimed at, are capable of eliminating different performance and programmability bottlenecks of current solutions. They will give better performance and simpler programmability than existing multicore processors. The target applications include various electronic appliances including e.g. computers (laptop, desktop, others) and smart phones or other portable/wearable computing devices.

The suggested, cost-efficient solution enables executing multioperations such as multi-prefix operations in the parallel processor systems, e.g. emulated shared memory computers, in double speed. It eliminates or reduces the need for expensive and power-hungry double clock rate memory. One major feature of different embodiments of the present invention resides in the provision of a small multi-port, typically dual-port cache used to balance the speed difference of memories and multioperation processing.

The suggested solution may further be cleverly adapted to different preferred cache line replacement or generally cache replacement policies such as LRU (least recently used), PLRU (pseudo-LRU), or LFU (least-frequently used). Also the associativity of the cache may be selected embodiment-specifically to suit the related needs, with reference to e.g. various set associative caches (two-way, four-way, etc.) or direct mapping version. Even a desired cache policy such as write-back or write-through convention may be applied. In the case of tight latency requirements, it is possible also to pipeline the cache access without problems.

The terms "first" and "second" are herein used to distinguish one element from other element, and not to specially prioritize or order them, if not otherwise explicitly stated.

The expression "a plurality of" may herein refer to any positive integer starting from two (2).

The expression "a number of" may herein refer to any positive integer starting from one (1), e.g. to one, two, three, etc.

Different embodiments of the present invention are disclosed in the attached dependent claims.

BRIEF DESCRIPTION OF THE DRAWINGS

Next the present invention will be described in greater detail with reference to the accompanying drawings, in which.

DETAILED DESCRIPTION

Figure 1:
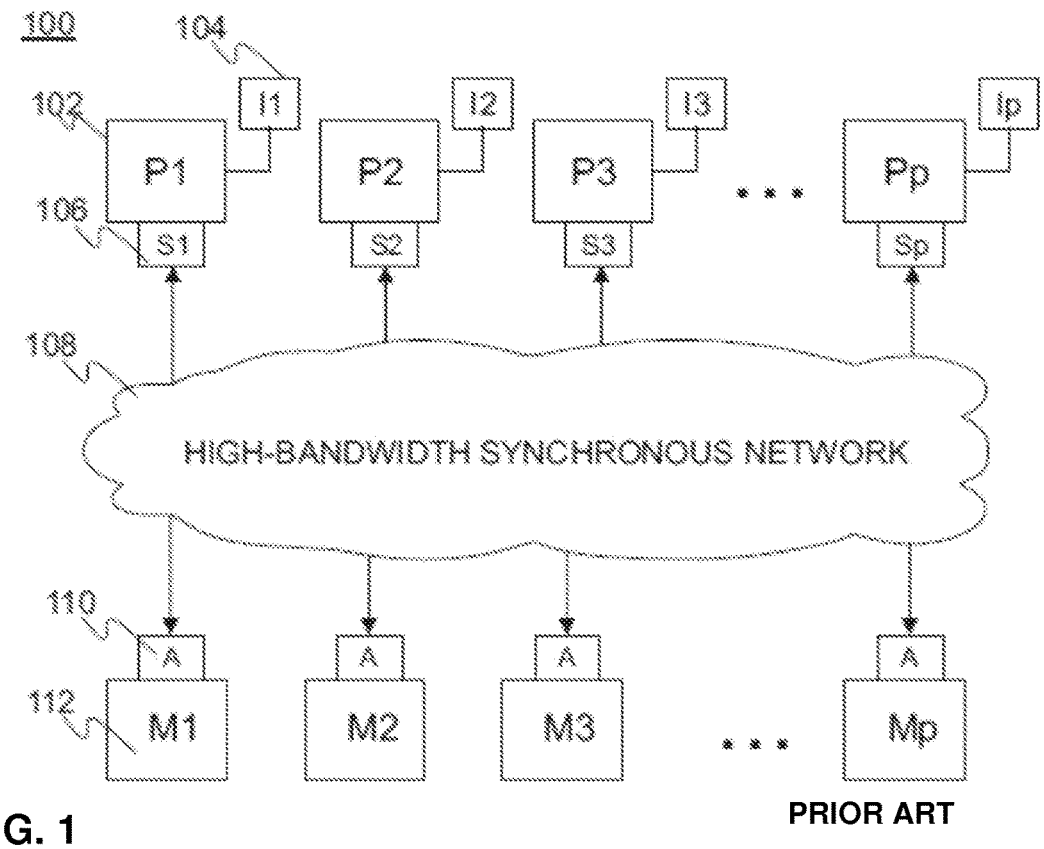
FIG. 1 illustrates one conception of a scalable ESM computer architecture as described in the literature.
Figure 2:
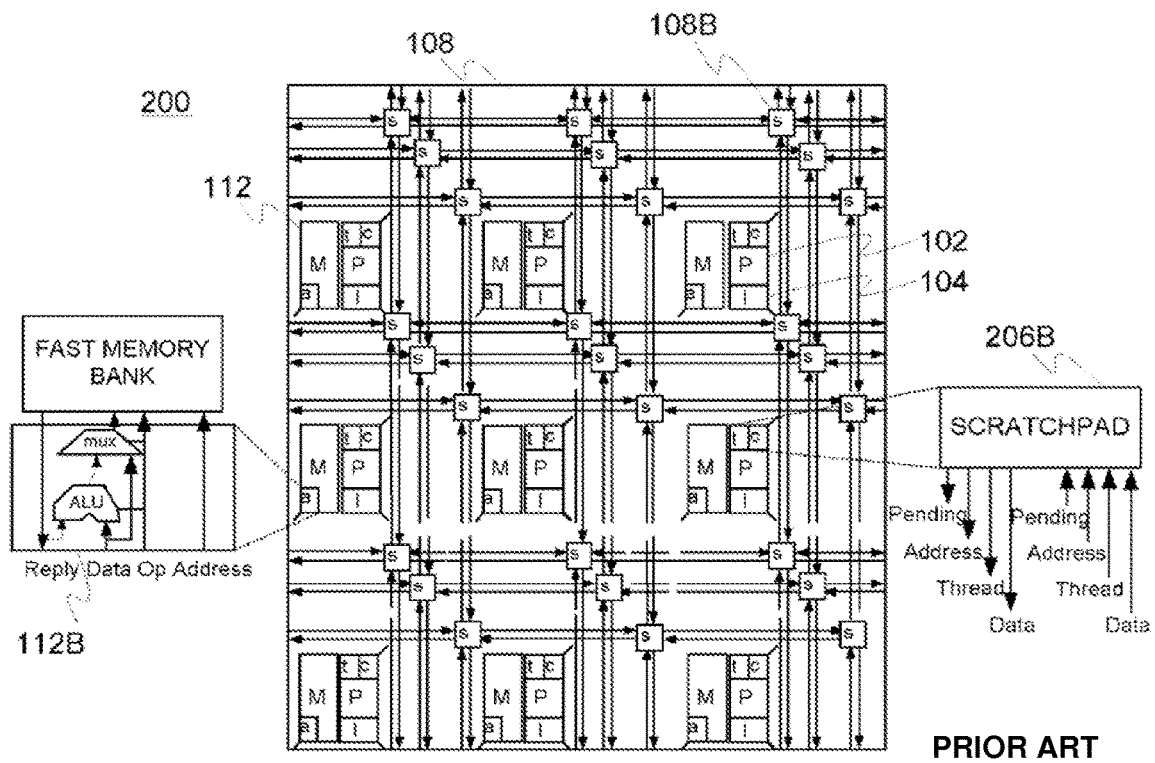
FIG. 2 is another illustration of potential ESM architecture, incorporating active memory units in connection with data memory modules.
Figure 3:
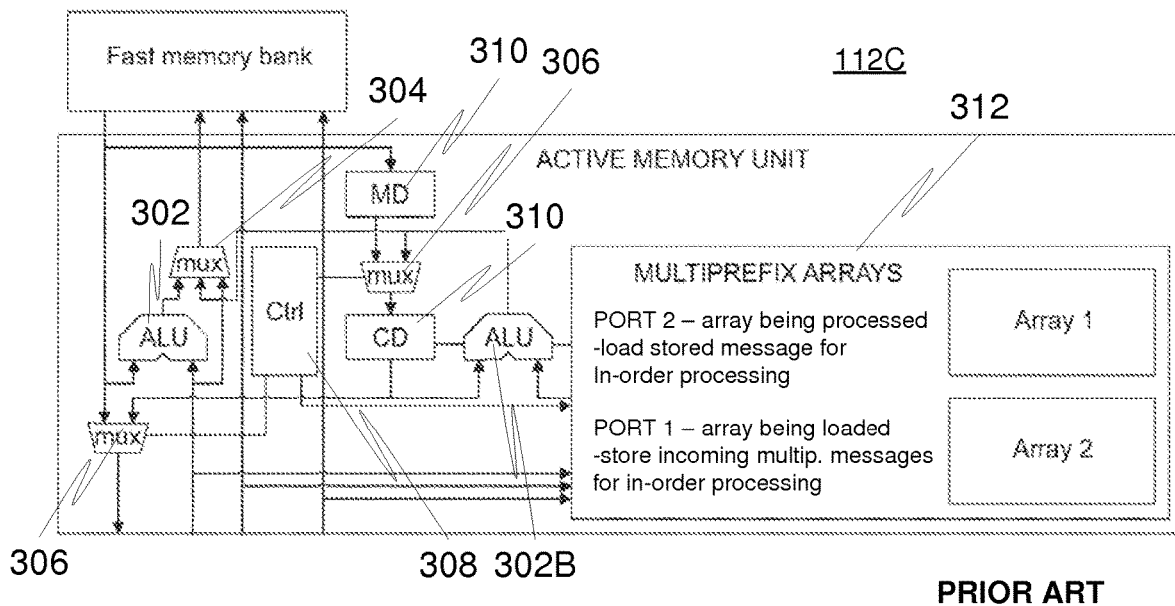
FIG. 3 illustrates a variant of an active memory unit.

FIGS. 1-3 were already contemplated hereinbefore in connection with the description of relevant background art.

Figure 4:
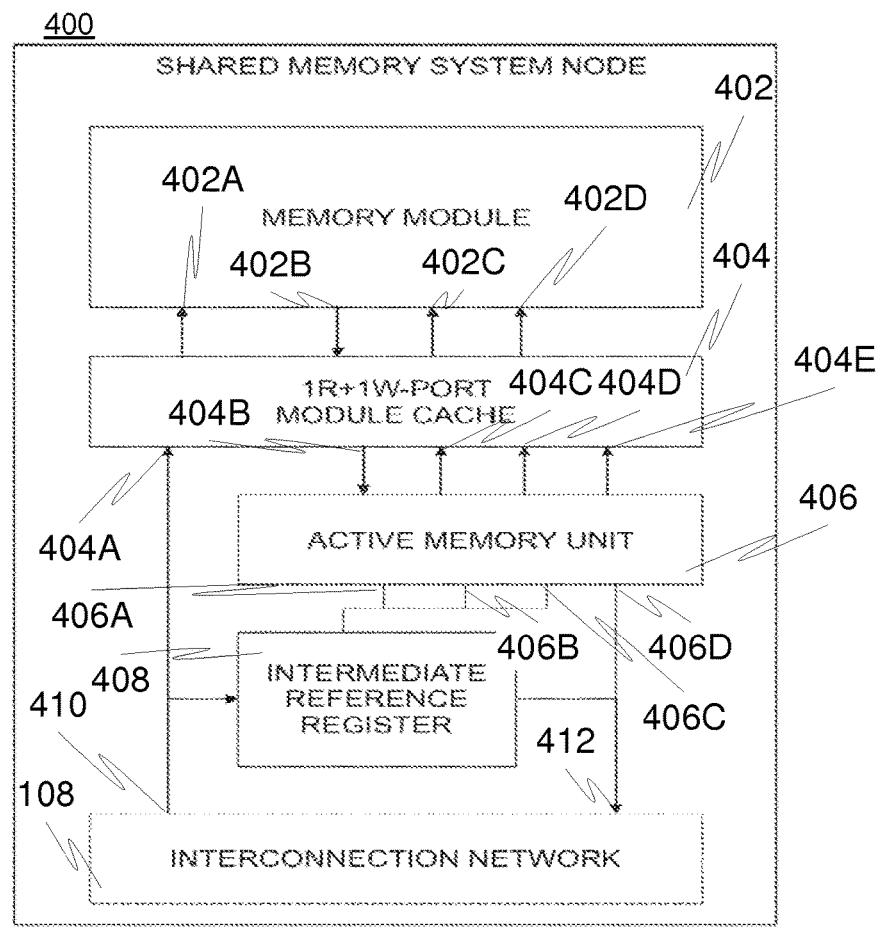
FIG. 4 illustrates an embodiment of the present invention comprising a memory node for ESM architectures with multi-port cache.

FIG. 4 illustrates, by way of example only, at 400 an embodiment of a (data) memory node suitable for use with parallel processor systems such as ESM architectures 100, 200 incorporating an interconnection, intercommunication network 108 operatively connecting multiple processors and memory nodes of the overall system architecture together for signaling e.g. instructions and data between them. The memory nodes disclosed herein are functional, and in most cases also structural, aggregates or ensembles serving the processors of the system e.g. via the fast interconnection network in terms of data storage and related special (e.g. inter-processing multioperation) data processing.

Item 402 refers to a data memory module that comprises data memory defining or realized as e.g. a memory bank of multiple storage units organized e.g. in matrix form. The memory shall have desired properties in terms of latency/access time, for instance. The module 402 may in some embodiments be generally similar to the modules 112 described hereinbefore. The module 402 may incorporate or be at least operatively coupled to a memory controller, which may be realized through appropriate circuitry, configured to manage data storing and reading activities.

The data memory of the module 402 may be operated responsive to external (control) signals, which may refer to a number of control (operation), data and/or address signals indicative of desired memory operation (e.g. read/write), data to be written (in the case of write operation), and concerned memory address(es), respectively. The corresponding signal connections with upper level memory element(s), comprising cache 404 in the shown embodiment, are indicated in the figure by the associated ports and lines or buses (address 402A, data out 402B, data in 402C, operation 402D).

The data memory module 402 is indeed connected to a preferably multi-port cache memory 404. Preferably the cache memory 404 is selected so as to exhibit lower latency/faster access in terms of access time than the data memory. In terms of available memory space, the cache is typically considerably smaller than the data memory, which reduces the necessary access time.

The cache 404 may be configured in accordance with a desired cache replacement policy, associativity and access convention or 'access policy' such as write policy, as being discussed hereinbefore.

The ports and related signal lines or buses connecting the cache 404 to an active memory unit 406 include e.g. address read 404A, data out 404B, data in 404C, operation 404D, and address write 404E.

Preferably the cache 404 is configured so as to enable substantially concurrent read and write during a single step of execution and preferably clock cycle.

The active memory unit 406 is configured to execute referenced multioperations based on the data received 410 (reference in from the network 108) via the interconnection network 108 and data accessible via the cache 404. The unit 406 may be provided with incoming data 406A, previous data 404B, operation 406B, address 406C and reply 406D ports and corresponding lines/buses. The outgoing reference 412 is delivered forward again via the network 108.

Basically, a number of external memory references from multiple processors and e.g. related hardware such as step caches, scratchpads, etc. which are targeted to the same memory location in the data memory 402, are processed by the active memory unit 406 of the corresponding memory module 400 hosting the addressed memory location in accordance with and responsive to the type of the multioperation.

For example, a number of processors may be first arranged to determine processor-wise multioperation, e.g. multi-prefix, results and provide them as operands of multioperation references to the appropriate memory node 400 and active memory unit 406 therein for executing the remaining inter-processor multioperations using e.g. in-order processing and data already present in and/or available through the cache 404. The results may be returned to the processors and appropriate threads therein for the ultimate computations to finish the (potentially in-order) multioperation execution.

The active memory unit 406 may in some embodiments be configured to at least partially or selectively adopt the characteristics and features of the aforementioned active memory units 110, 112B and/or 112C.

Item 408 refers to an intermediate reference register passing received multioperation references towards the active memory unit responsive to pipeline operation of the underlying architecture including memory access.

Figure 5:
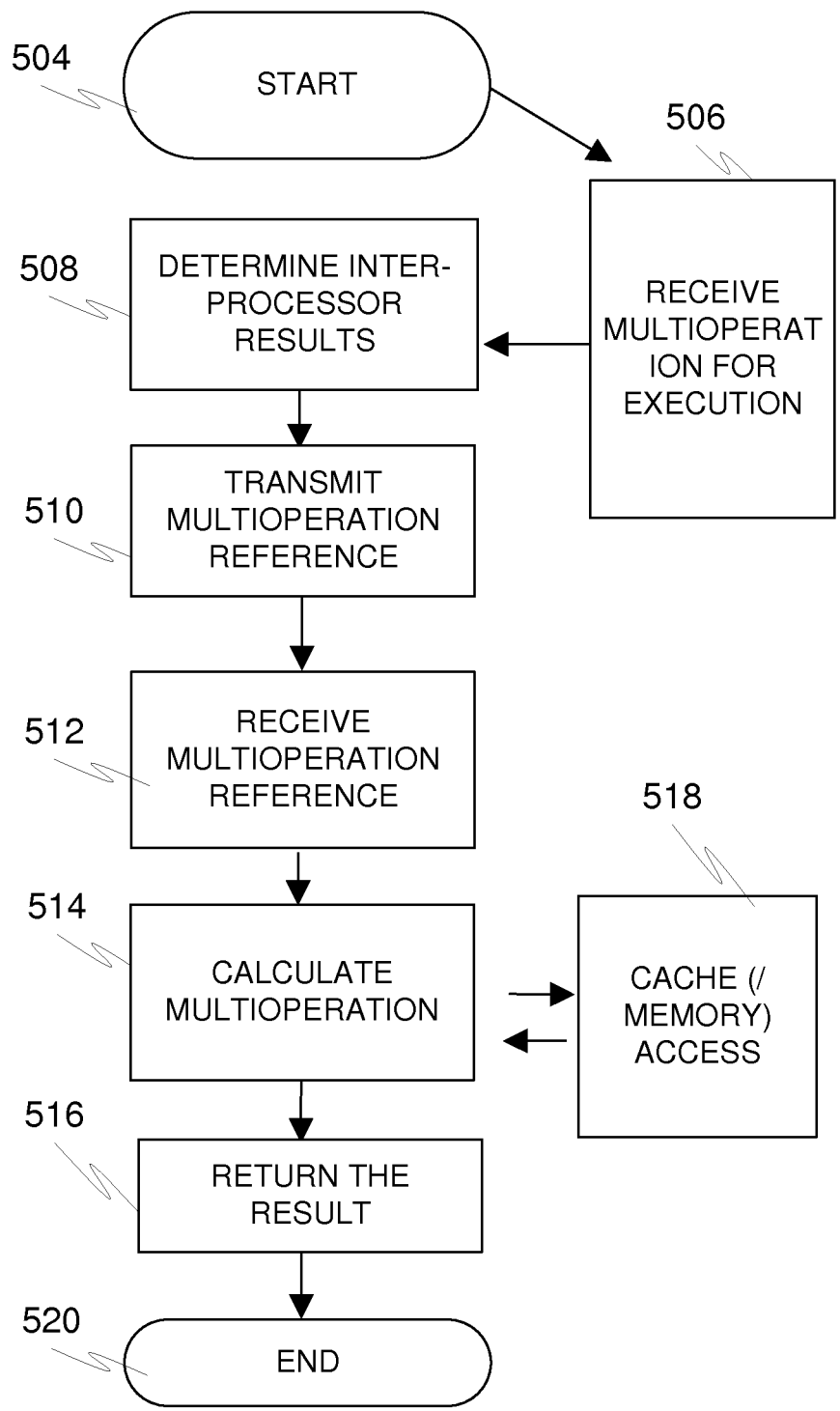
FIG. 5 is a flow diagram disclosing an embodiment of a method for executing multioperation in a memory node in accordance with an embodiment of the present invention.

FIG. 5 includes a flow diagram 500 disclosing an embodiment of a method in accordance with the present invention.

At start-up 504, a number of preparatory actions such as obtaining the hardware incorporating ESM platform or other applicable parallel processor system and configuring it by the desired software are executed.

The platform/system shall contain a number of, typically a plurality of, memory nodes containing e.g. a memory module with data memory, an active memory unit and a module cache, potentially also intermediate reference register for pipelined variants, in accordance with an embodiment of the present invention, configured following the basic principles set forth hereinbefore.

At 506, multioperation is received for execution at a number of processors, typically two or more processors, in accordance with computer program, or 'software', containing a plurality of instructions to be performed by a number of threads of the processors.

At 508, the intra-processor results of the multioperation are determined at each processor utilizing e.g. scratchpads and/or step caches for the purpose.

At 510, the determined processor-wise results are transferred, preferably via an interconnection network, to a target memory node for inter-processor calculation.

At 512, the multioperation references containing e.g. the results, target data address, and indication of the operation to be performed are received at the memory node. The execution of the shown method items thus switches over to the memory node from the processor(s) and processor-associated hardware (e.g. scratchpads, step caches, buffers).

At 514, the inter-processor portion of the multioperation is executed by the active memory unit using both the received data, such as the intra-processor (processor-wise) results, and target (as indicated by the memory reference) data in the cache 518.

As described herein earlier, when a multioperation reference arrives to a memory node with a cache, a cache search may be performed. In the case of a hit, the multioperation can be performed in the active memory unit using cached data and data in the reference. The result of the operation is preferably written to the cache. In the case of a miss, i.e. referenced data not currently being present in cache, an unused cache line, or generally cache block, may be allocated if available and the data from the actual memory address of the reference is fetched thereto from the lower level data memory. The rest of the operation may be done similarly as in the case of hit. If there are no free cache lines available, a line may be selected according to the selected cache line replacement policy. If necessary, the existing data may be written into the memory module and then the operation is done similarly as in the case of a miss with unused cache line available. In the case of tight latency requirements, it is possible to pipeline the cache access.

At 516, the memory node send or generally provide the results of inter-processor multioperation calculation back to the processors, or in practice e.g. scratchpad/step cache units thereat, from which they may be further spread back to the threads for the final multioperation calculation.

The method execution thus switches generally back to the processor side from now on. Depending on the implementation of concerned elements, especially the active memory unit as being deliberated hereinbefore, the ordering of the multioperations, such as multi-prefix operation, may be preserved or not during the process.

At 520, the final calculations may occur at the processors and the method execution is ended. The final results may be provided forward and utilized as desired, for instance.

The scope of the present invention is determined by the attached claims together with the equivalents thereof. A person skilled in the art will appreciate the fact that the disclosed embodiments were constructed for illustrative purposes only, and other arrangements applying many of the above principles could be readily prepared to best suit each potential use scenario.

The invention claimed is:

1. A data memory node for use in ESM (Emulated Shared Memory) architectures, comprising:
   a data memory module containing data memory for storing input data therein and retrieving stored data therefrom responsive to predetermined control signals;
   a multi-port cache for the data memory, said cache being provided with at least one read port and at least one write port, said cache being configured to hold recently and/or frequently used data stored in the data memory; and
   an active memory unit at least functionally connected to a plurality of processors via an interconnection network, said active memory unit being configured to operate the cache upon receiving a multioperation reference incorporating a memory reference to the data memory of the data memory module from a number of processors of said plurality of processors, wherein the data memory node is an additional physical unit and separate with respect to related hardware of any of the plurality of processors, wherein the related hardware include step cache(s), scratchpad(s) and buffer(s) of or associated with each of the processors of the architecture, and
   wherein responsive to the receipt of the multioperation reference including intra-processor results determined at the processors of the architecture, the active memory unit is configured to process the multioperation reference according to the type of the multioperation indicated in the reference and to execute inter-processor portion of the multioperation, utilizing cached data in the multi-port cache in accordance with the memory reference and data provided in the multioperation reference.

2. The node of claim 1, configured to return the outcome of the executed multioperation to said number of processors.

3. The node of claim 1, wherein said multioperation reference comprises a reference of a multi-prefix operation.

4. The node of claim 1, wherein the active memory unit is configured to execute a cache search to determine whether the referenced data is available in the cache or not.

5. The node of claim 4, wherein the active memory unit is configured, in the case of a cache miss, first allocate a cache block and fetch the referenced data from the memory to the block.

6. The node of claim 5, wherein in the case of no free cache blocks available, further configured to select an already occupied cache block according to the used cache line replacement policy for the fetching.

7. The node of claim 6, configured to store the existing data of the selected block into the data memory prior to said fetching.

8. The node of claim 1, wherein the active memory unit is further configured to write the result of the multioperation into the cache.

9. The node of claim 1, comprising an intermediate register configured to input, store and pass incoming multioperation references towards the active memory unit responsive to pipeline operation of the underlying hardware architecture including memory access.

10. A parallel processor system, preferably ESM system, comprising a plurality of processors and multiple data memory nodes according to claim 1.

11. A method for executing a multioperation in a memory node of a parallel processor computing system, preferably ESM (Emulated Shared Memory) system, said node comprising a data memory module containing data memory for storing data, a multi-port cache for the data memory, and active memory unit at least functionally connected to a plurality of processors via an interconnection network, wherein the data memory node is an additional physical unit and separate with respect to related hardware of any of the plurality of processors, wherein the related hardware include step cache(s), scratchpad(s) and buffer(s) of or associated with each of the processors of the architecture, said method comprising:
- receiving a multioperation reference incorporating a memory reference including intra-processor results determined at the processors of the architecture to the data memory from a number of processors of the plurality of processors,
- processing the multioperation reference according to the type of the multioperation indicated in the multioperation reference and executing inter-processor portion of the multioperation,
- utilizing cached data in the multi-port cache in accordance with the memory reference and data provided in the multioperation reference, and
- providing the outcome of the processing to said number of processors.

* * * * *